US007847884B2

(12) United States Patent
Jeng

(10) Patent No.: US 7,847,884 B2
(45) Date of Patent: Dec. 7, 2010

(54) OPTICAL FILM AND MANUFACTURING METHOD THEREOF AND SUBSTRATE STRUCTURE AND DISPLAY PANEL USING THE OPTICAL FILM

(75) Inventor: Yue-Shih Jeng, Miaoli County (TW)

(73) Assignees: Taiwan TFT LCD Association, Hsinchu (TW); Chunghwa Picture Tubes, Ltd., Taoyuan (TW); Au Optronics Corporation, Hsinchu (TW); Hannstar Display Corporation, Taipei County (TW); Chi Mei Optoeletronics Corporation, Tainan County (TW); Industrial Technology Research Institute, Hsinchu (TW); TPO Dispalys Corp., Miao-Li County (TW)

( * ) Notice: Subject to any disclaimer, the term of this patent is extended or adjusted under 35 U.S.C. 154(b) by 358 days.

(21) Appl. No.: 11/867,694

(22) Filed: Oct. 5, 2007

(65) Prior Publication Data
US 2008/0170192 A1 Jul. 17, 2008

(30) Foreign Application Priority Data
Jan. 17, 2007 (TW) .............................. 96101358 A

(51) Int. Cl.
*G02F 1/1347* (2006.01)
(52) U.S. Cl. ...................................... 349/74
(58) Field of Classification Search .................... 349/74
See application file for complete search history.

(56) References Cited
U.S. PATENT DOCUMENTS
6,147,726 A * 11/2000 Kubota et al. ................. 349/74

| | | | |
|---|---|---|---|
| 2001/0001679 A1* | 5/2001 | Tolt et al. ...................... | 427/78 |
| 2004/0169912 A1* | 9/2004 | Liang et al. ................. | 359/296 |
| 2006/0119767 A1 | 6/2006 | Liu et al. | |
| 2006/0169788 A1* | 8/2006 | Empedocles et al. ........ | 235/492 |
| 2006/0187388 A1* | 8/2006 | Ohyama et al. ............. | 349/114 |

FOREIGN PATENT DOCUMENTS

| JP | 2003-177395 | 6/2003 |
|---|---|---|
| JP | 2005128196 | 5/2005 |

OTHER PUBLICATIONS

"2nd Office Acton of China Counterpart Application", issued on Jul. 9, 2010, pp. 1-6, in which the listed reference was cited.

* cited by examiner

*Primary Examiner*—Uyen-Chau N Le
*Assistant Examiner*—Hoang Tran
(74) *Attorney, Agent, or Firm*—Jianq Chyun IP Office

(57) ABSTRACT

A manufacturing method of an optical film is provided. The method includes the following steps. A substrate is provided first and a surface of the substrate is aligned or an alignment layer is formed on the substrate. Next, a defined pattern layer is formed on the aligned surface of the substrate or on a surface of the alignment layer at a first temperature. A first liquid crystal layer is then coated on the aligned surface of the substrate or the surface of the alignment layer to cover the defined pattern layer. Then, a first curing step is performed at a second temperature to enable the defined pattern layer and the first liquid crystal layer to form the optical film. A portion of the optical film having the defined pattern layer is characterized by a different liquid crystal alignment property from the other portion of the optical film.

6 Claims, 10 Drawing Sheets

OPTICAL FILM AND MANUFACTURING METHOD THEREOF AND SUBSTRATE STRUCTURE AND DISPLAY PANEL USING THE OPTICAL FILM

CROSS-REFERENCE TO RELATED APPLICATION

This application claims the priority benefit of Taiwan application serial no. 96101358, filed on Jan. 17, 2007. All disclosure of the Taiwan application is incorporated herein by reference.

BACKGROUND OF THE INVENTION

1. Field of the Invention

The present invention relates to a multi-functional optical film, a manufacturing method thereof, and a substrate structure and a display panel using the optical film, such that a plurality of the optical films with multiple functions can be manufactured in a simplified manufacturing process. Said optical films are randomly combined by any patterned and non-patterned liquid crystal films.

2. Description of Related Art

Conventionally, an optical film of a display panel is usually manufactured through an adhering process. In other words, various optical films are adhered to a substrate layer by layer through an adhesion material. Moreover, additional passivation layers are required to protect the optical films. Afterwards, the substrate having a plurality of the optical films is separately adhered to the display panel. In the conventional manufacturing method, the adhesion material is required by each of the optical films, and the optical films necessitate a support from the substrate and protection of the passivation layer, thus leading to high manufacturing costs of the optical films and a negative impact on the optical characteristics of the optical films. Moreover, an excessive thickness of each of the optical films manufactured by said conventional method can be expected.

As regards conventional patterned compensation films adopted by three-dimensional display panels or semi-transmissive display panels, a non-adhering method of forming the patterned compensation films has been proposed. However, as a plurality of the optical films is to be formed by integrating other films such as polarizing films, an alignment layer sandwiched between every two of the liquid crystal layers is required to specifically align the liquid crystal layers, for the patterned compensation films and the polarizing films in use are liquid crystal material layers. Due to the requirement of an additional alignment layer disposed between every two of the liquid crystal layers, the process of manufacturing the optical films remains complicated, and a thickness of each optical film cannot be effectively reduced.

On the other hand, in the method of manufacturing the conventional patterned compensation film, a defined pattern layer composed of photoresist material is formed on the alignment layer, and the liquid crystal layer is then formed on the defined pattern layer to form the compensation film. Said method has the pitfall of a lower adhesion at the interface and the boundary between the photoresist material and liquid crystals because of the difference therebetween. Moreover, if the photoresist material is used as the defined pattern layer, only an aligned patterned compensation film or an unaligned patterned compensation film may be defined, restricting the application of the patterned compensation films.

SUMMARY OF THE INVENTION

The present invention provides an optical film including at least a patterned liquid crystal film. The optical film is characterized by various liquid crystal alignment properties.

The present invention further provides an optical film including at least a patterned liquid crystal film, and no additional alignment film between every two of the films is required.

The present invention further provides a manufacturing method of an optical film. Said manufacturing method is capable of forming a patterned liquid crystal film with various liquid crystal alignment properties and of defining the liquid crystal alignment in the patterned liquid crystal film.

The present invention further provides a manufacturing method of an optical film to form a plurality of the optical films randomly combined by any of the patterned and the non-patterned liquid crystal films, and no additional alignment film between every two of the films is required.

The present invention further provides a manufacturing method of an optical film to form a patterned optical film without employing photomasks.

The present invention further provides a manufacturing method of an optical film to improve the conventional complicated manufacturing process and to reduce high costs.

The present invention further provides a substrate structure of a display panel, in which an optical film is directly formed on the substrate. Thus, no additional adhering process is required for adhering the optical film to the substrate.

The present invention further provides a display panel, in which the optical film is directly formed thereon. The manufacturing process is then simplified and the costs are reduced.

The present invention provides an optical film including a substrate, a first liquid crystal layer and a second liquid crystal layer. The substrate has an aligned surface or an alignment layer formed thereon. The first liquid crystal layer is disposed on the aligned surface of the substrate or on the alignment layer, and the second liquid crystal layer is disposed on a surface of the first liquid crystal layer, so as to form a multi-layer film including the first and the second liquid crystal layers. At least one of the first and the second liquid crystal layers is a patterned liquid crystal layer including at least two patterned regions, each of which is characterized by different liquid crystal alignment properties.

The present invention provides a manufacturing method of an optical film, including the following steps. A substrate is provided first and a surface of the substrate is aligned or an alignment layer is formed on the substrate. A defined pattern layer is then formed on the aligned surface of the substrate or on a surface of the alignment layer at a first temperature. The material of the defined pattern layer includes liquid crystal material. Next, a first liquid crystal layer is coated on the aligned surface of the substrate or on the surface of the alignment layer to cover the defined pattern layer. Thereafter, a first curing step is performed at a second temperature for enabling the defined pattern layer and the first liquid crystal layer to form the optical film. A portion of the optical film composed of the defined pattern layer is characterized by a different liquid crystal alignment property from the other portion of the optical film.

The present invention provides a substrate structure of a display panel, including a substrate, a first alignment layer, a first liquid crystal layer and a second liquid crystal layer. A device layer is already disposed on the substrate. The first alignment layer is disposed on a surface of the substrate. The first liquid crystal layer is disposed on a surface of the first alignment layer, and the second liquid crystal layer is disposed on a surface of the first liquid crystal layer, so as to form a multi-layer film including the first and the second liquid crystal layers. At least one of the first and the second liquid crystal layers is a patterned liquid crystal layer including at least two patterned regions, each of which is characterized by different liquid crystal alignment properties.

The present invention provides a display panel, including a first substrate, a first alignment layer, a first multi-layer film, a second substrate, a second alignment layer, a second multi-layer film and a display medium. A first device layer is already disposed on the first substrate. The first alignment layer is disposed on a surface of the first substrate. The first multi-layer film is disposed on a surface of the first alignment layer. Here, the first multi-layer film is composed of at least two liquid crystal layers. The second substrate is disposed on an opposite side of the first substrate, and a second device layer is already disposed on the second substrate. The second alignment layer is disposed on a surface of the second substrate. The second multi-layer film is disposed on a surface of the second alignment layer. Here, the second multi-layer film is composed of at least two liquid crystal layers. The display medium is sandwiched between the first substrate and the second substrate. At least one of the first and the second liquid crystal layers is a patterned liquid crystal layer including at least two patterned regions, each of which is characterized by different liquid crystal alignment properties.

The present invention further provides a manufacturing method of an optical film, including the following steps. First, a surface of a substrate is aligned or an alignment layer is formed on the substrate. Next, a liquid crystal layer is coated on the aligned surface of the substrate or on a surface of the alignment layer, and then a curing step is performed to cure the liquid crystal layer. Thereafter, a laser scanning is implemented on a portion of the cured liquid crystal layer, and the scanned liquid crystal layer is removed to form a patterned liquid crystal layer.

The present invention further provides a manufacturing method of an optical film, at least including the following steps. A substrate is provided first and a surface of the substrate is aligned or an alignment layer is then formed on the substrate. A first liquid crystal layer is then coated on the aligned surface of the substrate or on a surface of the alignment layer, and a first curing step is performed. Next, a second liquid crystal is coated on a surface of the first liquid crystal layer. Thereafter, a second curing step is performed at a first temperature with use of a patterned photomask, so as to cure an exposed portion of the second liquid crystal layer and form a first patterned region. Afterwards, a third curing step is performed on the second liquid crystal layer at a second temperature, so as to cure the other portion of the second liquid crystal layer excluding the first patterned region and form a second patterned region. The liquid crystal layer composed of the first patterned region is characterized by different liquid crystal alignment properties from the liquid crystal layer composed of the second patterned region.

In view of the foregoing, the patterned liquid crystal film of the present invention is capable of defining the liquid crystal alignment based on actual demands, such that the patterned liquid crystal film is characterized by various liquid crystal alignment properties and is applicable to diverse fields.

In addition, the optical film having the patterned liquid crystal film provided by the present invention merely requires one alignment layer for directly forming the multi-functional multi-layer film randomly combined by any of the patterned and the non-patterned liquid crystal films on the alignment layer. That is to say, no additional alignment layer between every two of the films in the multi-layer film is required. Accordingly, the optical film having the patterned liquid crystal film disclosed in the present invention can simplifying manufacturing process and reducing costs.

It is to be understood that both the foregoing general description and the following detailed description are exemplary, and are intended to provide further explanation of the invention as claimed.

DESCRIPTION OF EMBODIMENTS

Manufacturing Method of an Optical Film

Figure 1A:
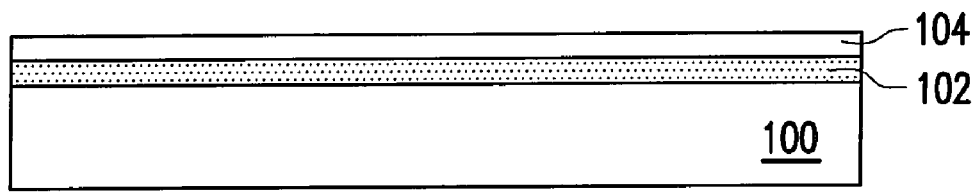
FIGS. 1A through 1F are cross-sectional views illustrating a process of manufacturing an optical film according to one embodiment of the present invention.

FIGS. 1A through 1F are cross-sectional views illustrating a process of manufacturing an optical film according to one embodiment of the present invention. Referring to FIG. 1A, a substrate 100 is provided at first, and the substrate 100 has an alignment layer 102 configured thereon. The substrate 100 may be transparent or opaque, and the material thereof is, for example, glass or plastic. The material of the alignment layer 102 includes, for example, organic alignment material or inorganic alignment material. In another embodiment, if the substrate 100 is transparent, a surface of the substrate 100 may be directly aligned without additionally forming the alignment layer 102.

Next, an ultra thin liquid crystal layer 104 is coated on a surface of the alignment layer 102 or on the surface of the aligned transparent substrate 100. According to one embodiment of the present invention, the method of coating the liquid crystal layer 104 includes performing a spin coating, a blade coating, a mayer bar/rod coating, or a slot die blade coating, for example. The material of the liquid crystal layer 104 includes liquid crystal monomers, liquid crystal polymers, liquid crystal oligomers, or liquid crystal material including pigments, for example.

Figure 1B:
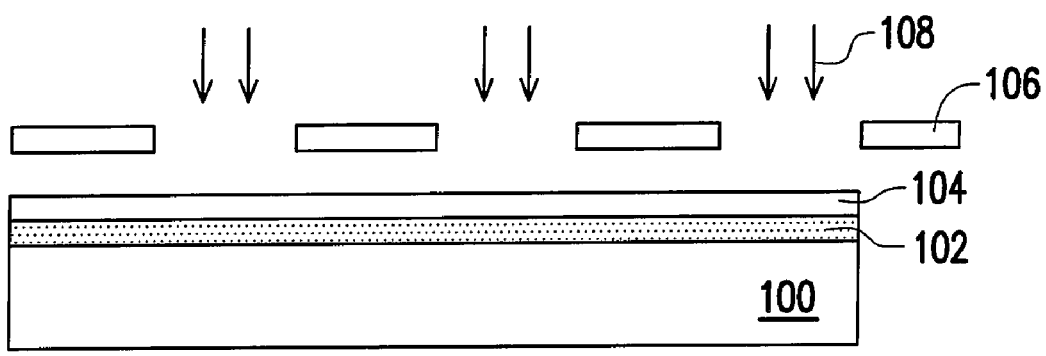

Then, referring to FIG. 1B, a curing step is performed at a specific first temperature with use of a patterned photomask 106 through which a portion of the liquid crystal layer 104 is exposed, such that the exposed portion of the liquid crystal layer 104 is cured. According to one embodiment of the present invention, the first temperature exceeds 90° C., for example. The curing step is, for example, an ultraviolet curing treatment employing an ultraviolet light 108.

Figure 1C:
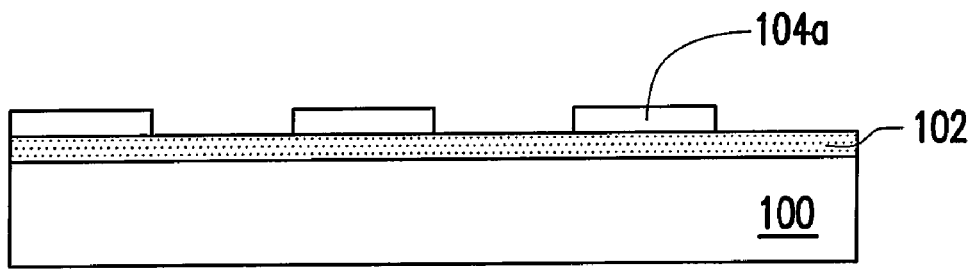

Thereafter, referring to FIG. 1C, an unexposed and uncured portion of the liquid crystal layer 104 is removed to form a defined pattern layer 104a. According to one embodiment of the present invention, the method of removing the unexposed and uncured portion of the liquid crystal layer 104 includes, for example, performing a cleaning process with use of an appropriate solution, such as acetone.

Figure 1D:
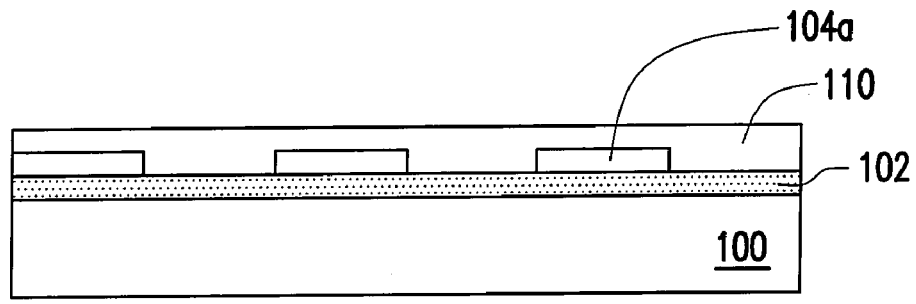

Next, referring to FIG. 1D, a liquid crystal layer 110 is coated on the aligned surface of the substrate 100 or on the surface of the alignment layer 102 to cover the defined pattern layer 104a. According to one embodiment of the present invention, the method of coating the liquid crystal layer 110 and the material thereof are identical or similar to the method of coating the liquid crystal layer 104 and the material thereof.

Figure 1E:
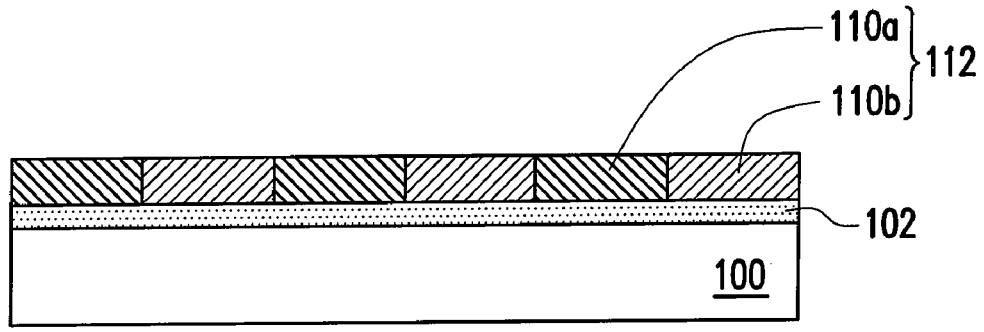

Afterwards, referring to FIG. 1E, the curing step is performed on the liquid crystal layer 110 at a second temperature for enabling the defined pattern layer 104a and the liquid crystal layer 110 to form the patterned liquid crystal layer 112. The patterned liquid crystal layer 112 includes patterned regions 110a and 110b which are characterized by different liquid crystal alignment properties. According to one embodiment of the present invention, the second temperature is room temperature, for example. The curing step is, for example, the ultraviolet curing treatment or a thermal curing treatment.

Based on actual demands and the liquid crystal material employed to manufacture the patterned liquid crystal layer 112 according to the aforesaid method, a patterned polarizing optical film or a patterned compensation optical film to be fabricated is determined.

Moreover, the present embodiment is demonstrated by forming one defined pattern layer 104a, but the present invention is not limited to this. With different temperature or various liquid crystal materials, other defined pattern layers may be formed in the present invention. Thereby, the eventually-formed patterned liquid crystal layer 112 may include a plurality of the patterned regions, each of which features the different liquid crystal alignment properties.

It should be noted that distinct liquid crystal alignments on the defined pattern layer 104a result in dissimilar properties at different temperatures, and thereby the defined pattern layer 104a formed at the specified first temperature is provided with the specific liquid crystal alignment properties. Hence, the formation of the liquid crystal layer 110 on the defined pattern layer 104a at the second temperature allows the patterned region 110a having the defined pattern layer 104a and the patterned region 110b having the other portion of the later-formed patterned liquid crystal layer 112 to possess the different liquid crystal alignment properties. In comparison with the related art which can merely define an aligned patterned compensation film or an unaligned patterned compensation film, the present invention is able to randomly define the liquid crystal alignment in the aforementioned regions based on actual demands, and thus a plurality of the regions having the different liquid crystal alignment properties can be defined in the patterned liquid crystal layer 112. For the above reasons, the patterned optical film formed in accordance with the present embodiment is more applicable.

Besides, according to the present invention, the liquid crystal material is utilized to define the defined pattern layer 104a. Thereby, when the liquid crystal layer 110 is formed on the defined pattern layer 104a, a cross-linking reaction is initiated at the interface and the boundary of the two liquid crystal layers, for self-assembly of the two liquid crystal layers occurs due to a functional group effect. Said reaction further enhances stability and resistance of the optical film.

Figure 1F:
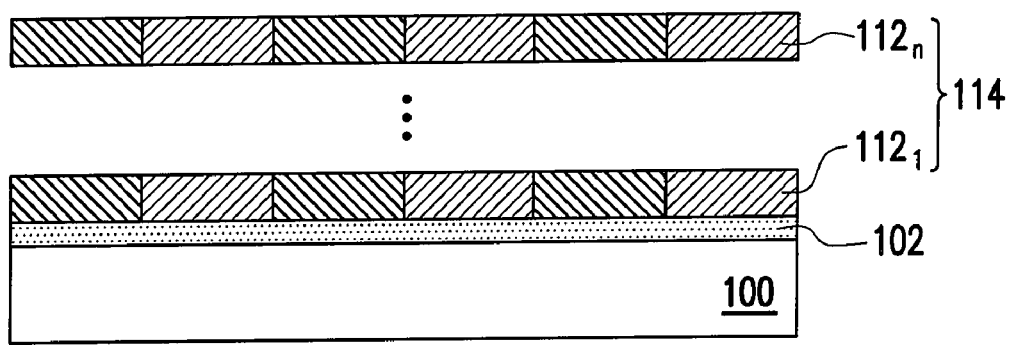

According to said embodiment, the patterned liquid crystal layer 112 is formed as a result, but the present invention is not limited to this. Referring to FIG. 1F, at least a liquid crystal layer $112_n$ may be formed on a surface of the patterned liquid crystal layer $112_1$ in the present invention. Accordingly, the multi-layer film 114 is composed of the patterned liquid crystal layer $112_1$ and at least one liquid crystal layer $112_n$. Besides, through self-assembling features of the liquid crystal layers, no additional alignment layer or adhesion layer is required between every two of the liquid crystal layers in the multi-layer film 114. In addition, the number of the liquid crystal layers in the multi-layer film 114, the material of each of the liquid crystal layers, and the arrangement of the liquid crystal layers can be determined according to the actual function (e.g. polarization, compensation, wide view angle) required by the optical film.

Figure 2A:
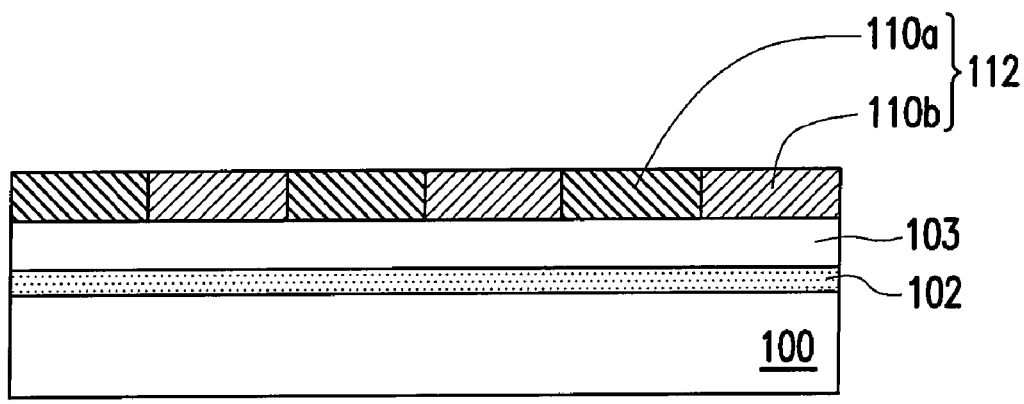
FIGS. 2A through 2B are cross-sectional views illustrating an optical film according to another embodiment of the present invention.

FIG. 2A is a cross-sectional view illustrating an optical film according to another embodiment of the present invention. In FIG. 2A, the same reference numbers are used to refer to the same parts in FIGS. 1A through 1F, and the same descriptions are omitted. In the present embodiment, the difference between FIG. 2A and FIG. 1E lies in that a liquid crystal layer 103 is formed on an alignment layer 102 according to FIG. 2A, and a patterned liquid crystal layer 112 is formed on the liquid crystal layer 103. The manufacturing method of the optical film depicted in FIG. 2A includes forming the liquid crystal layer 103 on a surface of the alignment layer 102 or on an aligned transparent substrate 100. The method of forming the patterned liquid crystal layer 112 is the same as the method illustrated in FIGS. 1A through 1E, and thus no further description is provided herein.

One of the liquid crystal layer 103 and the patterned liquid crystal layer 112 may be a compensation liquid crystal layer, and the other is a polarizing liquid crystal layer. In other words, if the liquid crystal layer 103 is a compensation liquid crystal layer, the patterned liquid crystal layer 112 is a patterned polarizing liquid crystal layer. Alternatively, if the liquid crystal layer 103 is a polarizing liquid crystal layer, the patterned liquid crystal layer 112 is a patterned compensation liquid crystal layer.

Other than the above, the optical film of FIG. 2A requires neither an additional alignment layer nor an adhesive layer between the liquid crystal layer 103 and the patterned liquid crystal layer 112. Instead, the direct contact and self-assembly between the liquid crystal layer 103 and the patterned liquid crystal layer 112 enables the alignment effect on the alignment layer 102 to be extended to the patterned liquid crystal layer 112 via the liquid crystal layer 103.

Figure 2B:
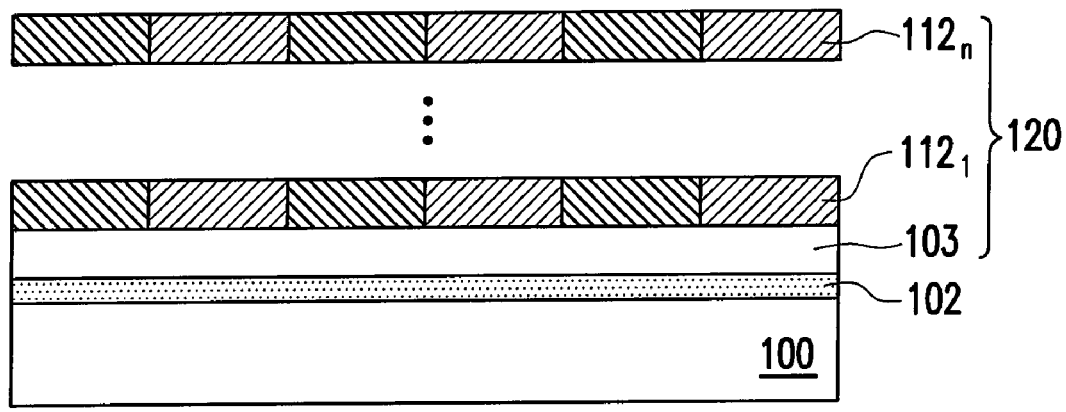

Likewise, according to FIG. 2A, the patterned liquid crystal layer 112 is formed as a result, but the present invention is not limited to this. Referring to FIG. 2B, the liquid crystal layer 112 composed of a patterned liquid crystal layer $112_1$ and at least one liquid crystal layer $112_n$ may be formed on a surface of the liquid crystal layer 103 according to the illustration in FIG. 1F and the relevant descriptions herein. And the liquid crystal layer 103, the patterned liquid crystal layer $112_1$, and said liquid crystal layer $112_n$ together form a multi-layer film 120.

Figure 3A:
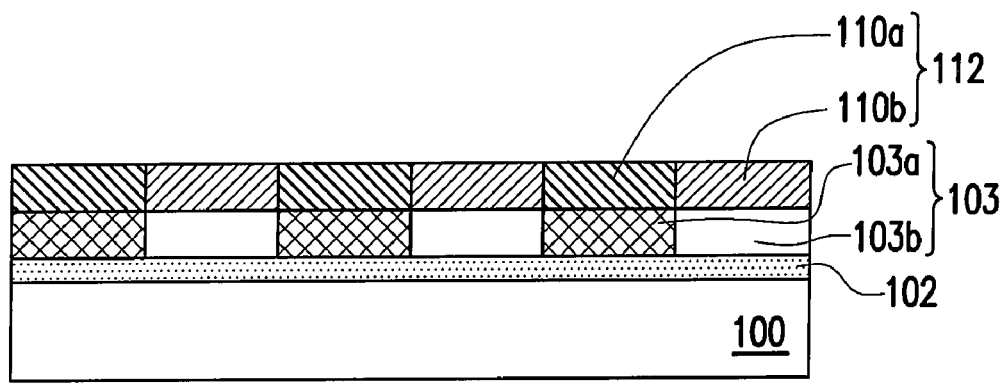
FIGS. 3A through 3B are cross-sectional views illustrating an optical film according to still another embodiment of the present invention.

FIG. 3A is a cross-sectional view illustrating an optical film according to another embodiment of the present invention. In FIG. 3A, the same reference numbers are used to refer to the same parts in FIG. 2A, and the same descriptions are omitted as well. In the present embodiment, the difference between FIG. 3A and FIG. 2E lies in that a liquid crystal layer 103 is also a patterned film layer according to FIG. 3A, and the method of forming the liquid crystal layer 103 including patterned regions 103a and 103b is the same as the method illustrated in FIGS. 1A through 1E, and thus no further description is provided herein. Similarly, the method of forming a patterned liquid crystal layer 112 in the present embodiment is the same as the method illustrated in FIGS. 1A through 1E, and thus no further description is provided herein.

One of the liquid crystal layer 103 and the patterned liquid crystal layer 112 may be a compensation liquid crystal layer, and the other is a polarizing liquid crystal layer. In other words, if the liquid crystal layer 103 is a compensation liquid crystal layer, the patterned liquid crystal layer 112 is a patterned polarizing liquid crystal layer. Alternatively, if the liquid crystal layer 103 is a patterned polarizing liquid crystal layer, the patterned liquid crystal layer 112 is a patterned compensation liquid crystal layer.

Figure 3B:
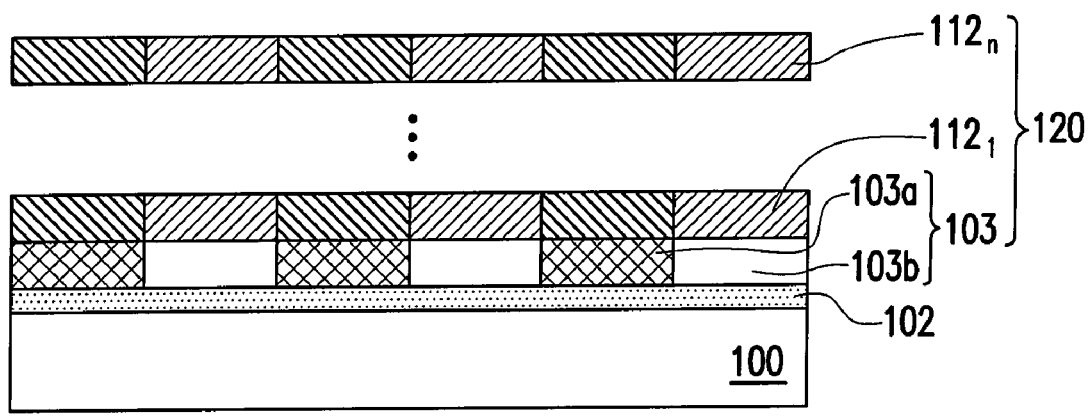

Likewise, according to FIG. 3A, the patterned liquid crystal layer 112 is formed as a result, but the present invention is not limited to this. Referring to FIG. 3B, the liquid crystal layer 112 composed of a patterned liquid crystal layer $112_1$ and of at least one liquid crystal layer $112_n$ may be formed on a surface of the liquid crystal layer 103 according to the illustration in FIG. 1F and the relevant descriptions herein. And the liquid crystal layer 103, the patterned liquid crystal layer $112_1$, and said liquid crystal layer $112_n$ together form a multi-layer film 120.

Based on the above, it is known that both the patterned liquid crystal film and the non-patterned liquid crystal film in the multi-layer film according to the present invention may be formed by performing the coating process, the curing process, and the like. Besides, neither the alignment layer nor the adhesive layer is required between every two of the film layers. Therefore, the manufacturing method disclosed in the present invention is capable of forming a plurality of the optical films randomly combined by any of the patterned and the non-patterned liquid crystal films.

Another Manufacturing Method of an Optical Film

Figure 4A:
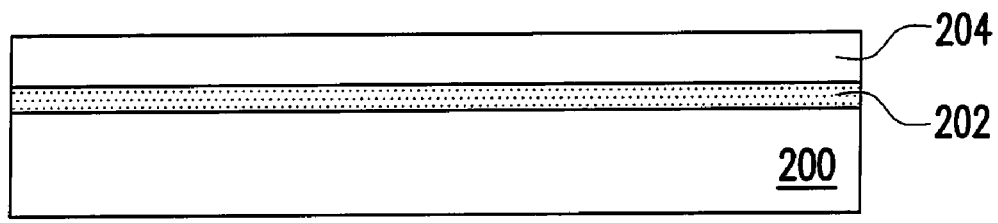
FIGS. 4A through 4C are cross-sectional views illustrating a process of manufacturing an optical film according to another embodiment of the present invention.
Figure 4B:
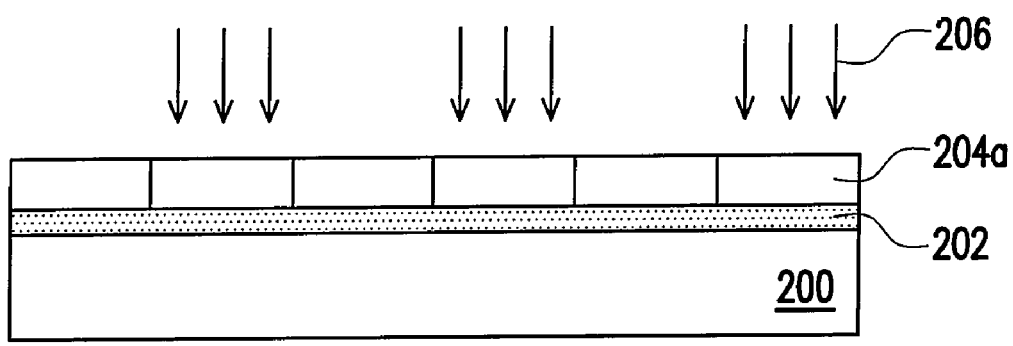
Figure 4C:
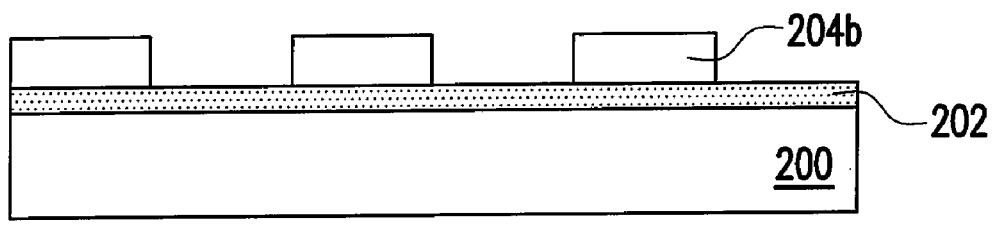

FIGS. 4A through 4C are cross-sectional views illustrating a process of manufacturing an optical film according to another embodiment of the present invention. Referring to FIG. 4A, a substrate 200 is provided at first, and the substrate 200 has an alignment layer 202 configured thereon. The substrate 200 may be transparent or opaque, and the material thereof is, for example, glass or plastic. The material of the alignment layer 202 includes, for example, organic alignment material or inorganic alignment material. In another embodiment, if the substrate 200 is transparent, a surface of the substrate 200 may be directly aligned without additionally forming the alignment layer 202.

Next, a liquid crystal layer 204 is coated on a surface of the alignment layer 202 or on the surface of the aligned transparent substrate 200. In one embodiment of the present invention, the method of coating the liquid crystal layer 204 includes performing a spin coating, a blade coating, a mayer bar/rod coating, or a slot die blade coating, for example. The material of the liquid crystal layer 204 includes liquid crystal monomers, liquid crystal polymers, liquid crystal oligomers, or liquid crystal material including pigments, for example. Thereafter, a curing step is performed so as to cure the coated liquid crystal layer 204. In one embodiment of the present invention, said curing step is, for example, an ultraviolet curing treatment.

Next, referring to FIG. 4B, a laser 206 is adopted to scan and expose a portion of the cured liquid crystal layer 204 in the absence of using photomasks. In one embodiment, for example, the laser 206 is utilized to scan a region 204a of the liquid crystal layer 204, such that cross-linking bonds of liquid crystals in the liquid crystal layer 204 are cleaved. Moreover, in one embodiment, the photomask may be adopted to perform the laser scanning and exposure as well.

Afterwards, referring to FIG. 4C, the scanned region 204a of the liquid crystal layer 204 is removed to form a patterned liquid crystal layer 204b. In one embodiment, the method of removing the scanned region 204a includes, for example, performing a cleaning process with use of an appropriate solution, such as acetone.

It should be noted that the cured liquid crystal layer is scanned by the laser beam and the scanned region is then removed in the present embodiment. Thereby, a patterning process may also be carried out on the cured liquid crystal layer. Furthermore, the photomask is not required in the laser scanning process; namely, the present embodiment may be implemented without adopting the photomask, which simplifies the manufacturing process.

Noticeably, the manufacturing method of the optical film in the present embodiment may be applied to fabricate the defined pattern layer 104a depicted in FIG. 1C. For example, an ultra thin liquid crystal layer (not shown) is formed in the step as shown in FIG. 4A, and the curing process is performed thereon at the specific first temperature. Thereafter, through the laser scanning process in FIG. 4B and the removing process in FIG. 4C, the defined pattern layer 104a as indicated in FIG. 1C is formed.

Still Another Manufacturing Method of an Optical Film

Figure 5A:
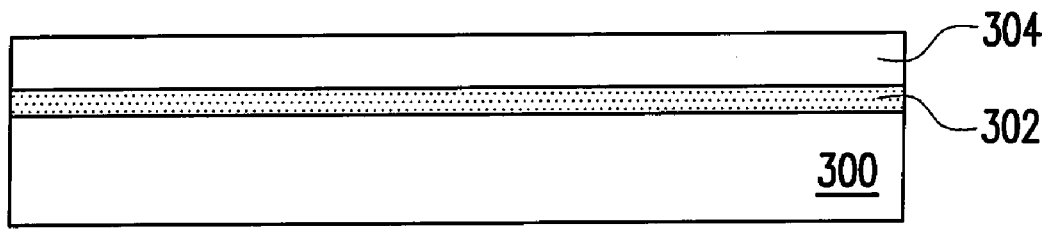
FIGS. 5A through 5D are cross-sectional views illustrating a process of manufacturing an optical film according to still another embodiment of the present invention.

FIGS. 5A through 5D are cross-sectional views illustrating a process of manufacturing an optical film according to still another embodiment of the present invention. Referring to FIG. 5A, a substrate 300 is provided at first, and the substrate 300 has an alignment layer 302 configured thereon. The substrate 300 may be transparent or opaque, and the material thereof is, for example, glass or plastic. The material of the alignment layer 302 includes, for example, organic alignment material or inorganic alignment material. In another embodiment, if the substrate 300 is transparent, a surface of the substrate 100 may be directly aligned without additionally forming the alignment layer 302.

Next, a liquid crystal layer 304 is coated on a surface of the alignment layer 302 or on the surface of the aligned transparent substrate 300. In one embodiment of the present invention, the method of coating the liquid crystal layer 304 includes performing a spin coating, a blade coating, a mayer bar/rod coating, or a slot die blade coating, for example. The material of the liquid crystal layer 304 includes liquid crystal monomers, liquid crystal polymers, liquid crystal oligomers, or liquid crystal material including pigments, for example.

Figure 5B:
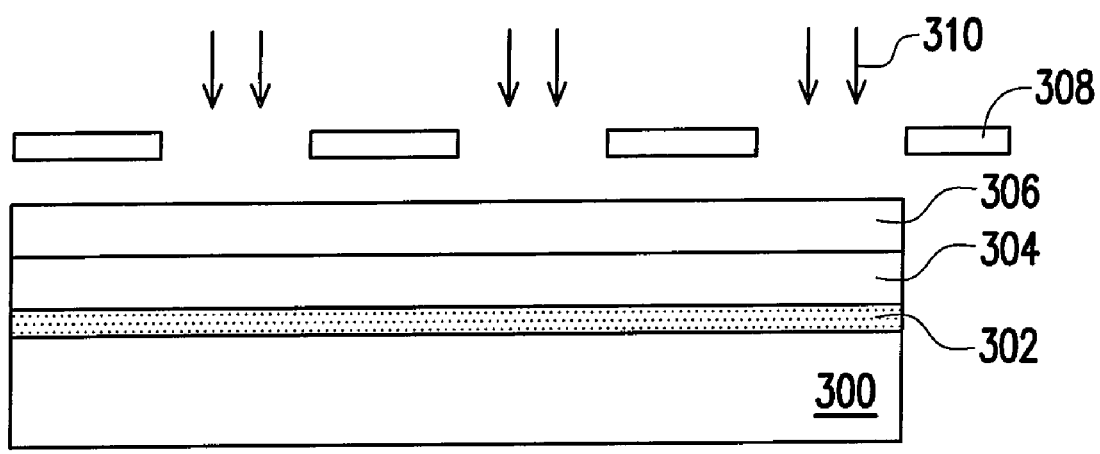

Then, referring to FIG. 5B, a liquid crystal layer 306 is coated on a surface of the liquid crystal layer 304. The coating method and the material of the liquid crystal layer 306 are identical or similar to those of the liquid crystal layer 304. Then, a curing step is performed at a specific first temperature with use of a patterned photomask 308 through which a portion of the liquid crystal layer 306 is exposed, such that the exposed portion of the liquid crystal layer 306 is cured. According to one embodiment of the present invention, the first temperature exceeds 90° C., for example. The curing step is, for example, an ultraviolet curing treatment employing an ultraviolet light 310.

Figure 5C:
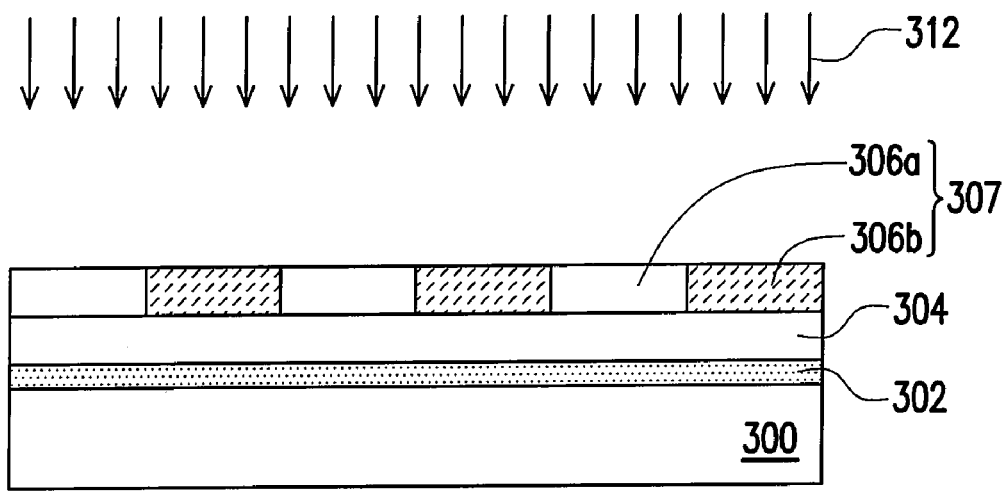

Thereafter, referring to FIG. 5C, the curing step is performed on the liquid crystal layer 306 at a second temperature to form a patterned liquid crystal layer 307. The patterned liquid crystal layer 307 includes patterned regions 306a and 306b which are characterized by different liquid crystal alignment properties. According to one embodiment of the present invention, the second temperature is room temperature, for example. The curing step is, for example, the ultraviolet curing treatment employing the ultraviolet light 312.

Note that the liquid crystal layer 304 and the patterned liquid crystal layer 307 are able to self-assemble as described hereinbefore. Besides, distinct liquid crystal alignments on the patterned liquid crystal layer 307 result in dissimilar properties at different temperatures, and thereby the patterned liquid crystal layer 307 of the present embodiment is capable of defining the liquid crystal alignment based on actual demands, such that a plurality of regions characterized by various liquid crystal alignment properties can be defined in the patterned liquid crystal layer 307.

Figure 5D:
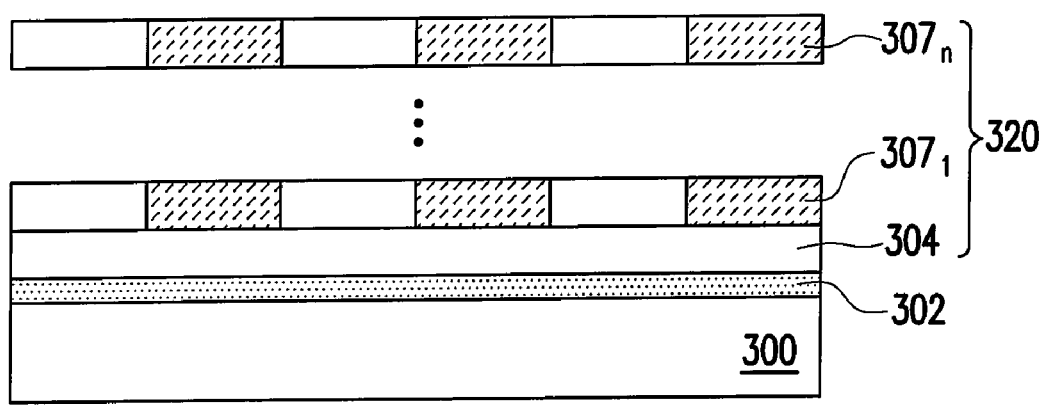

In addition, according to the present embodiment, the patterned liquid crystal layer 307 is formed as a result, but the present invention is not limited to this. Referring to FIG. 5D, at least a liquid crystal layer $307_n$ may be formed on a surface of the patterned liquid crystal layer $307_1$ in the present invention. Accordingly, a multi-layer film 320 is composed of the liquid crystal layer 304, the patterned liquid crystal layer $307_1$ and said liquid crystal layer $307_n$. And, through self-assembling features of the liquid crystal layers, no additional alignment layer or adhesion layer is required between every two of the liquid crystal layers in the multi-layer film 320. In addition, the number of the liquid crystal layers in the multi-layer film 320, the material of each of the liquid crystal layers, and the arrangement of the liquid crystal layers can be determined according to the actual function (e.g. polarization, compensation, wide view angle) required by the optical film.

Likewise, the patterned liquid crystal film and the non-patterned liquid crystal film in the multi-layer film according to FIG. 5D may be formed by performing the coating process, the curing process, and the like. Besides, neither the alignment layer nor the adhesive layer is required between every two of the film layers. Therefore, the manufacturing method disclosed in the present embodiment is capable of forming a plurality of the optical films randomly combined by any of the patterned and the non-patterned liquid crystal films.

A Substrate Structure of a Display Panel

Figure 6:
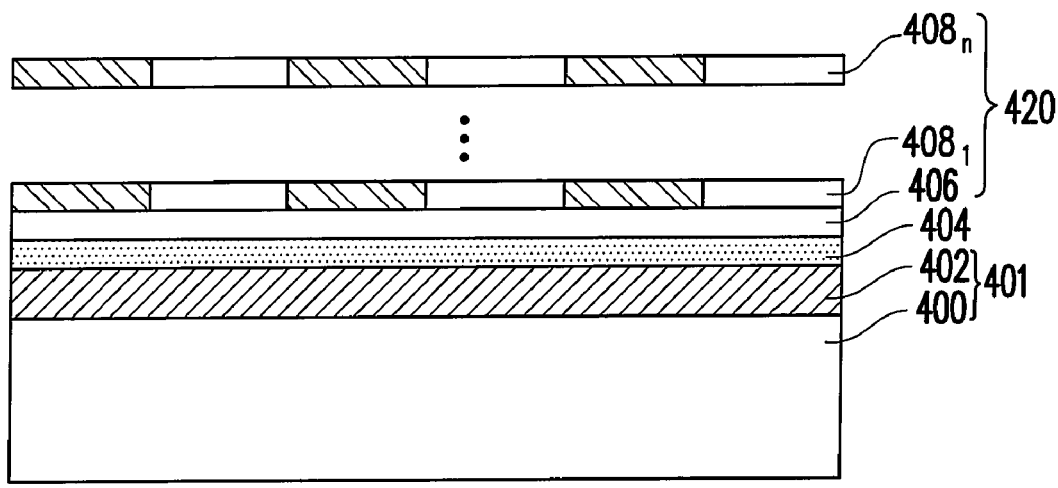
FIG. 6 is a cross-sectional view illustrating a substrate structure of a display panel according to one embodiment of the present invention.

Said optical film may be directly formed on a substrate structure of a display panel, such that the substrate structure is characterized by polarization, compensation, wide view angle, and so forth. FIG. 6 is a cross-sectional scheme illustrating the substrate structure of the display panel according to one embodiment of the present invention. Referring to FIG. 6, the substrate structure of the present embodiment includes a substrate 401, an alignment layer 404, and a multi-layer film 420.

The substrate 401 includes a blank substrate 400 and a device layer 402 formed thereon. The device layer 402 is, for example, an active device array layer, a passive device layer, a color filter layer, or a common electrode layer.

In addition, the alignment layer 404 is disposed on a surface of the device layer 402, and the material of the alignment layer 404 may be an organic or an inorganic alignment material. The multi-layer film 420 is disposed on a surface of the alignment layer 404. Particularly, the multi-layer film 420 includes a liquid crystal layer 406 and a patterned liquid crystal layer $408_1$. According to another embodiment, at least one liquid crystal layer $408_n$ included in the multi-layer film 420 may be stacked on a surface of the patterned liquid crystal layer $408_1$ other than the liquid crystal layer 406 and the patterned liquid crystal layer $408_1$. The material and the manufacturing method of the liquid crystal layer 406, the patterned liquid crystal layer $408_1$ and the liquid crystal layer $408_n$ are identical or similar to those of the liquid crystal layer provided in the aforesaid manufacturing method of the optical film (as shown in FIGS. 1A through 3B or FIGS. 5A through 5D). Thus, further descriptions are not provided herein.

Figure 7:
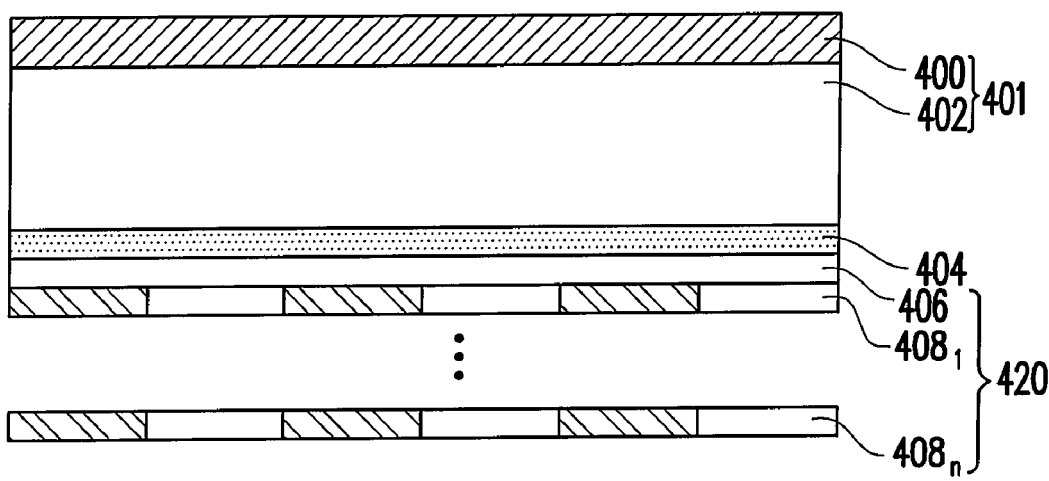
FIG. 7 is a cross-sectional view illustrating a substrate structure of a display panel according to another embodiment of the present invention.

FIG. 7 is a cross-sectional view illustrating a substrate structure of a display panel according to another embodiment of the present invention. Referring to FIG. 7, the substrate structure in FIG. 7 is similar to that in FIG. 6. The difference therebetween lies in that the alignment layer 404 and the multi-layer film 420 are formed on another surface of the substrate 400. That is to say, the device layer 402 is formed on one surface of the substrate 400, and the alignment layer 404 and the multi-layer film 420 are formed on the other.

The optical film (multi-layer film) provided in the present invention is randomly composed of any of the patterned liquid crystal films (including compensation films and polarizing films) and the non-patterned liquid crystal films (including the compensation films and the polarizing films) by performing the coating process and the curing process. Furthermore, no additional alignment layer is required between every two layers of the multi-layer film of the optical film. Therefore, the application of the optical film of the present invention to the fabrication of the substrate structure of the display panel is conducive to simplifying the process of manufacturing said substrate structure of the display panel and reducing the manufacturing costs. Besides, the patterned liquid crystal film of the present invention is capable of defining the liquid crystal alignment based on the actual demands, such that the patterned liquid crystal film is characterized by various liquid crystal alignment properties and is applicable to diverse fields.

In the present invention, the alignment layer and the multi-layer film are directly formed on the substrate structure of the display panel, so as to simplify the manufacturing process and reduce the costs. However, the present invention is not limited to this. Alternatively, the alignment layer and the multi-layer film may be firstly formed on the substrate to form the optical film in the present invention. Then, the optical film is adhered to the device substrate.

Display Panel

Figure 8:
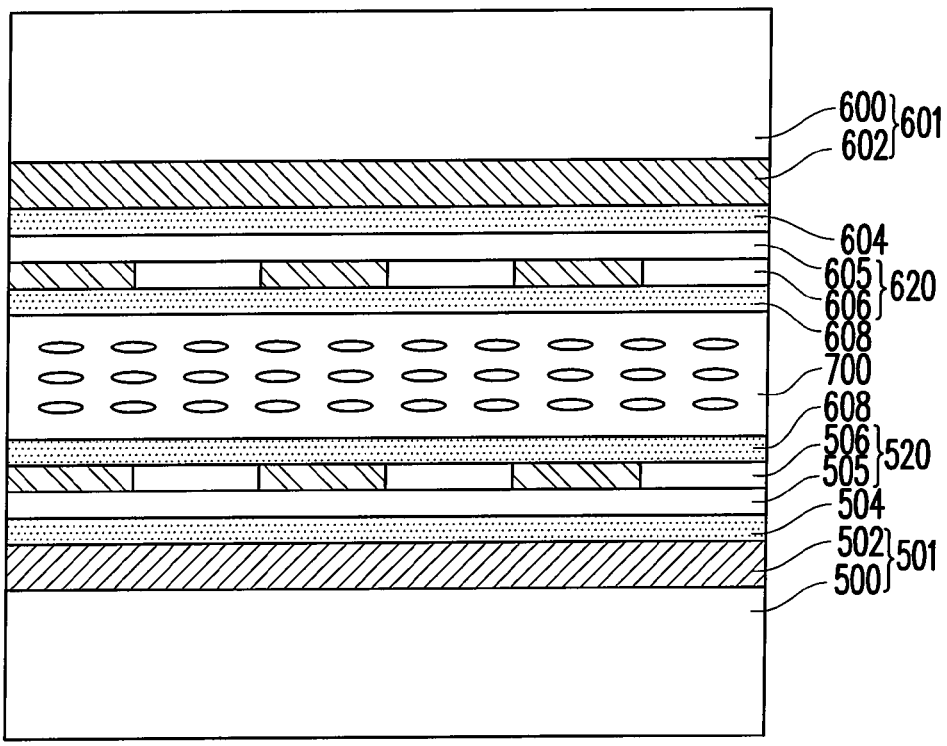
FIGS. 8 through 11 are cross-sectional views illustrating a display panel according to several embodiments of the present invention.

Said substrate structure may be combined with another substrate structure and a display medium so as to form a display panel. The detailed description is provided hereinafter. FIG. 8 is a cross-sectional scheme illustrating a display panel according to one embodiment of the present invention. Referring to FIG. 8, the display panel disclosed in the present embodiment includes a substrate 501, an alignment layer 504, a multi-layer film 520, another substrate 601, another alignment layer 604, another multi-layer film 620 and a display medium 700.

The substrate 501 includes a blank substrate 500 and a device layer 502 formed thereon. The device layer 502 is, for example, an active device array layer, a passive device layer, a color filter layer, or a common electrode layer. In detail, the device layer 502 may be an active device array layer, a passive device layer, a color filter layer, or a common electrode layer, which is determined by the type of the display panel (e.g. an active display panel, a passive display panel, and so forth).

The alignment layer 504 is disposed on a surface of the substrate 501. The multi-layer film 520 is disposed on a surface of the alignment layer 504 and is at least composed of a liquid crystal layer 505 and a patterned liquid crystal layer 506. In the present embodiment, the multi-layer film 520 including the liquid crystal layer 505 and the patterned liquid crystal layer 506 is taken for an example, while the number of the film layers included in the multi-layer film 520 is not limited in the present invention. The material and the manufacturing method of the liquid crystal layer 505 and the patterned liquid crystal layer 506 are identical or similar to those of the liquid crystal layer provided in the aforesaid manufacturing method of the optical film (as shown in FIGS. 1A through 3B or FIGS. 5A through 5D). Thus, further descriptions are not provided herein.

The substrate 601 is disposed on an opposite side of the substrate 501, and the substrate 601 includes a blank substrate 600 and a device layer 602 formed thereon. Determined by the type of the display panel and the corresponding device layer 502, the device layer 602 may be the active device array layer, the passive device layer, the color filter layer, or the common electrode layer. For example, if the display panel is the active display panel and the device layer 502 is the active device array layer, the device layer 602 is the color filter array layer, the common electrode layer, or a combination thereof. If the display panel is the passive display panel and the device layer 502 is one passive device layer, the device layer 602 is another passive device layer, the color filter array layer, or a combination thereof.

The alignment layer 604 is disposed on a surface of the substrate 601. The multi-layer film 620 is disposed on a surface of the alignment layer 604 and is at least composed of a liquid crystal layer 605 and a patterned liquid crystal layer 606. Similarly, in the present embodiment, the multi-layer film 620 including the liquid crystal layer 605 and the patterned liquid crystal layer 606 is taken for an example, while the number of the film layers included in the multi-layer film 620 is not limited in the present invention. The material and the manufacturing method of the liquid crystal layer 605 and the patterned liquid crystal layer 606 are identical or similar to those of the liquid crystal layer provided in the aforesaid manufacturing method of the optical film (as shown in FIGS. 1A through 3B or FIGS. 5A through 5D). Thus, further descriptions are not provided herein.

Furthermore, the display medium 700 is sandwiched between the substrate 501 and second substrate 601. The display medium 700 is liquid crystals, for example. If the liquid crystals are used as the display medium 700, the display panel is a liquid crystal display panel.

Given that the alignment layer is required by the display panel for aligning the display medium, the display panel may further include alignment layers 508 and 608. The alignment layer 508 is disposed on the multi-layer film 520, while the alignment layer 608 is disposed on the multi-layer film 620. The display medium 700 is sandwiched between the alignment layers 508 and 608. The alignment layers 508 and 608 are mainly utilized to align the display medium 700, such that the display medium 700 possesses a certain pre-tilt angle.

Figure 9:
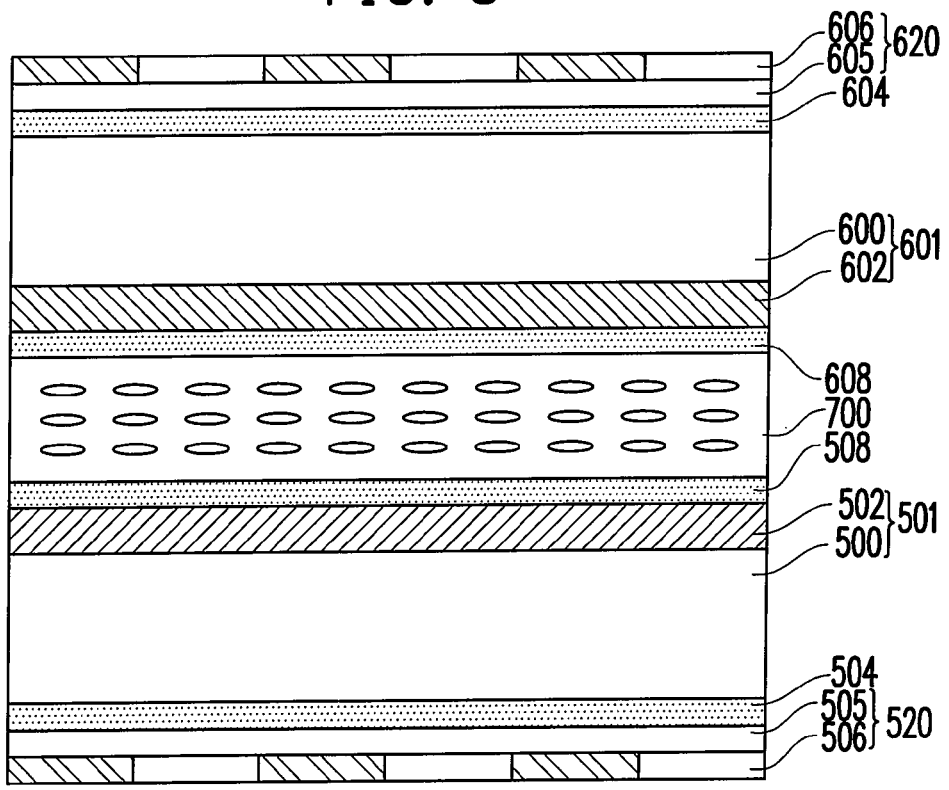

There are other ways to arrange the alignment layer 508, the alignment layer 608, and other film layers of the display panel. Referring to FIG. 9, the alignment layer 504 and the multi-layer film 520 are disposed on one surface of the substrate 501, while the alignment layer 508 is disposed on another. Likewise, the alignment layer 604 and the second multi-layer film 620 are disposed on one surface of the substrate 601, and the alignment layer 608 is disposed on another. Here, the display medium 700 is sandwiched between the alignment layers 508 and 608, so as to align the display medium 700.

Figure 10:
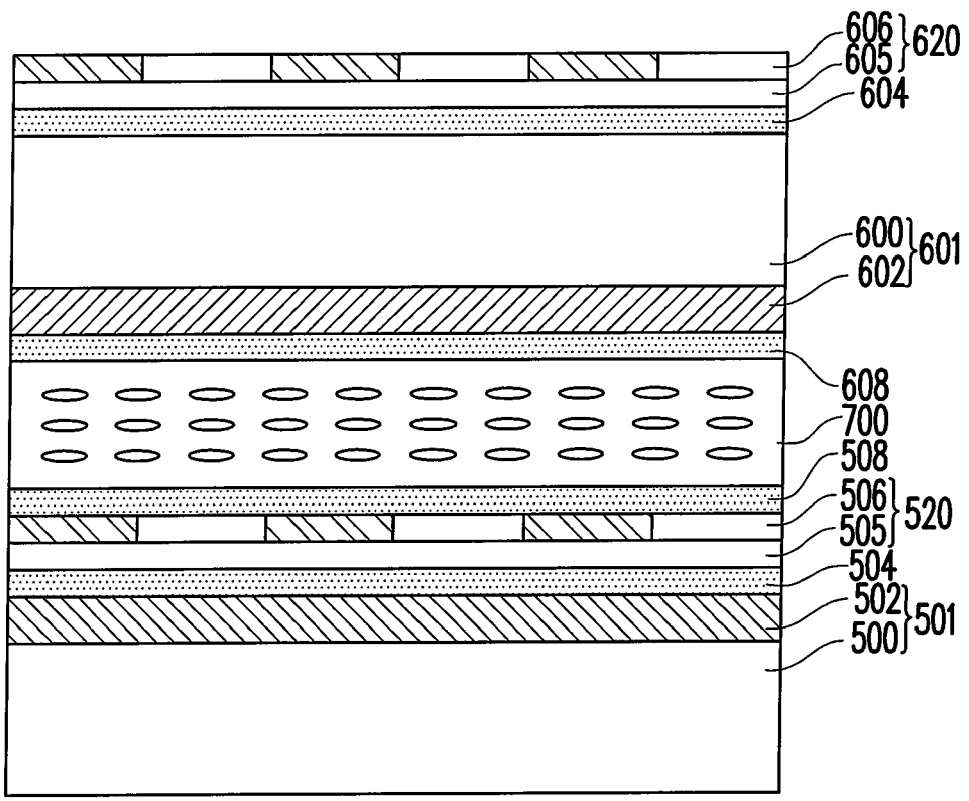

Moreover, in another embodiment of the present invention, the arrangement of the alignment layer 508, the alignment layer 608, and other film layers of the display panel is shown in FIG. 10. The alignment layer 508 is disposed on the multi-layer film 520, and the alignment layer 608 is disposed on the surface of the substrate 601 without the dispositions of the alignment layer 604 and the multi-layer film 620 on said surface. Here, the display medium 700 is sandwiched between the alignment layers 508 and 608, so as to align the display medium 700.

Figure 11:
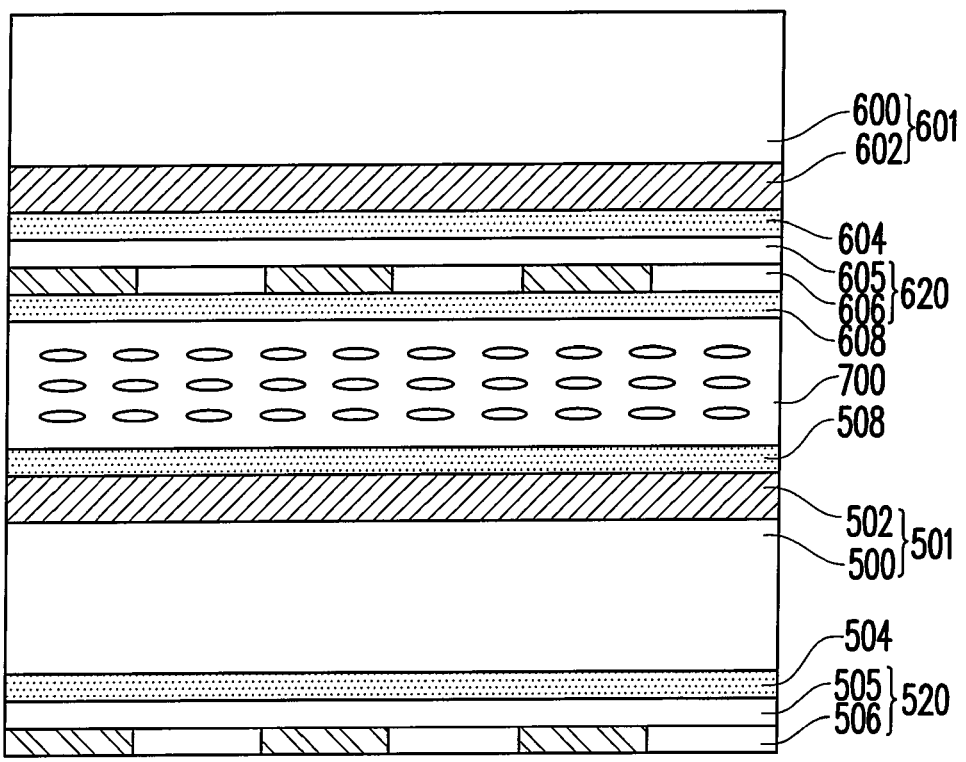

Moreover, in another embodiment of the present invention, the arrangement of the alignment layer 508, the alignment layer 608, and other film layers of the display panel is shown in FIG. 11. The alignment layer 508 is disposed on the surface of the substrate 501 without the dispositions of the alignment layer 504 and the multi-layer film 520 on said surface, and the alignment layer 608 is disposed on the multi-layer film 620. Here, the display medium 700 is sandwiched between the alignment layers 508 and 608, so as to align the display medium 700.

In the display panel of the present invention, the optical film (multi-layer film) is randomly composed of any of the patterned liquid crystal films (including compensation films and polarizing films) and the non-patterned liquid crystal films (including the compensation films and the polarizing films) by performing the coating process and the curing process. Furthermore, no additional alignment layer is required between every two layers of the multi-layer film of the optical film. Therefore, the display panel of the present invention is conducive to simplifying the manufacturing process and reducing the manufacturing costs. Besides, the patterned liquid crystal film of the present invention is capable of defining the liquid crystal alignment based on the actual demands, such that the patterned liquid crystal film is characterized by various liquid crystal alignment properties and is applicable to diverse fields.

Although the present invention has been disclosed above by the embodiments, they are not intended to limit the present invention. Anybody skilled in the art can make some modifications and alteration without departing from the spirit and scope of the present invention. Therefore, the protecting range of the present invention falls in the appended claims.

What is claimed is:

1. A display panel, comprising:
   a first substrate, wherein a first device layer is disposed thereon;
   a first alignment layer, disposed on a surface of the first substrate and covers the first device layer;
   a first multi-layer film, disposed on a surface of the first alignment layer and covers the first alignment layer, wherein the first multi-layer film comprises at least two liquid crystal layers which directly contact to each other;
   a second substrate, disposed on an opposite side of the first substrate, a second device layer being disposed on the second substrate;
   a second alignment layer, disposed on a surface of the second substrate and covers the second device layer;
   a second multi-layer film, disposed on a surface of the second alignment layer and covers the second alignment layer, wherein the second multi-layer film comprises at least two liquid crystal layers which directly contact to each other; and
   a display medium, sandwiched between the first and the second substrates, wherein at least one of the at least two liquid crystal layers of the first and the second multi-layer films is a patterned liquid crystal layer comprising at least two patterned regions characterized by different liquid crystal alignment properties.

2. The display panel as claimed in claim 1, further comprising:
   a third alignment layer, disposed on the first multi-layer film; and
   a fourth alignment layer, disposed on the second multi-layer film, wherein the display medium is sandwiched between the third and the fourth alignment layers.

3. The display panel as claimed in claim 1, further comprising:
   a third alignment layer, disposed on another surface of the first substrate; and
   a fourth alignment layer, disposed on another surface of the second substrate, wherein the display medium is sandwiched between the third and the fourth alignment layers.

4. The display panel as claimed in claim 1, further comprising:
   a third alignment layer, disposed on the first multi-layer film; and
   a fourth alignment layer, disposed on another surface of the second substrate, wherein the display medium is sandwiched between the third and the fourth alignment layers.

5. The display panel as claimed in claim 1, further comprising:
   a third alignment layer, disposed on another surface of the first substrate; and
   a fourth alignment layer, disposed on the second multi-layer film, wherein the display medium is sandwiched between the third and the fourth alignment layers.

6. The display panel as claimed in claim 1, wherein the first and the second device layers comprise an active device array layer, a passive device layer, a color filter layer, or a common electrode layer, respectively.

* * * * *